(12) United States Patent
Vasilev

(10) Patent No.: US 6,877,524 B2
(45) Date of Patent: Apr. 12, 2005

(54) VALVE FOR WINTERIZING A POOL

(75) Inventor: Dimce Vasilev, Wheaton, IL (US)

(73) Assignee: Gigit Inc., Addison, IL (US)

( * ) Notice: Subject to any disclaimer, the term of this patent is extended or adjusted under 35 U.S.C. 154(b) by 51 days.

(21) Appl. No.: 10/366,136

(22) Filed: Feb. 13, 2003

(65) Prior Publication Data

US 2004/0159355 A1 Aug. 19, 2004

(51) Int. Cl.$^7$ ............................. F16K 15/02; E04H 4/14
(52) U.S. Cl. ............... 137/528; 137/512.1; 137/533.19; 4/496; 4/507
(58) Field of Search .............................. 137/512.1, 528, 137/533.17, 533.19, 516.11, 543.19, 543.23, 540; 251/284, 324, 325; 4/496, 507, 688, 689

(56) References Cited

U.S. PATENT DOCUMENTS

| | | | |
|---|---|---|---|
| 1,356,298 A | * 10/1920 | McGregor | ............... 137/512.1 |
| 1,971,659 A | * 8/1934 | Ruthven | ....................... 137/243 |
| 2,622,615 A | * 12/1952 | Golden et al. | ............ 137/512.1 |
| 2,748,798 A | * 6/1956 | Withrow | ................. 137/533.17 |
| 3,099,999 A | * 8/1963 | Vismara | ................. 137/543.23 |
| 4,281,422 A | 8/1981 | Simonelli | |
| 4,368,550 A | 1/1983 | Stevens | |
| 4,655,248 A | * 4/1987 | Chalaire | ...................... 137/528 |
| 4,705,629 A | * 11/1987 | Weir et al. | ................... 210/340 |
| 4,752,979 A | 6/1988 | Goacher, Sr. | |
| 5,259,076 A | 11/1993 | Voight et al. | |
| 5,577,274 A | * 11/1996 | Plotsky et al. | .................. 4/507 |
| 5,671,902 A | 9/1997 | Gauthiere et al. | |
| 6,495,034 B1 | * 12/2002 | Schmidtke et al. | ......... 210/169 |

* cited by examiner

Primary Examiner—Ramesh Krishnamurthy
(74) Attorney, Agent, or Firm—John Lagowski

(57) ABSTRACT

A valve assembly for use in winterizing a swimming pool has a plurality of flow apertures and opens to allow water to flow out of the swimming pool pipes and conduits through a valve flow conduit and the flow apertures and into the pool, and closes under the pressure of the water in the pool to prevent the water from flowing back through the flow apertures, thereby enabling one to empty the pipes and conduits without having to drain the pool.

21 Claims, 3 Drawing Sheets

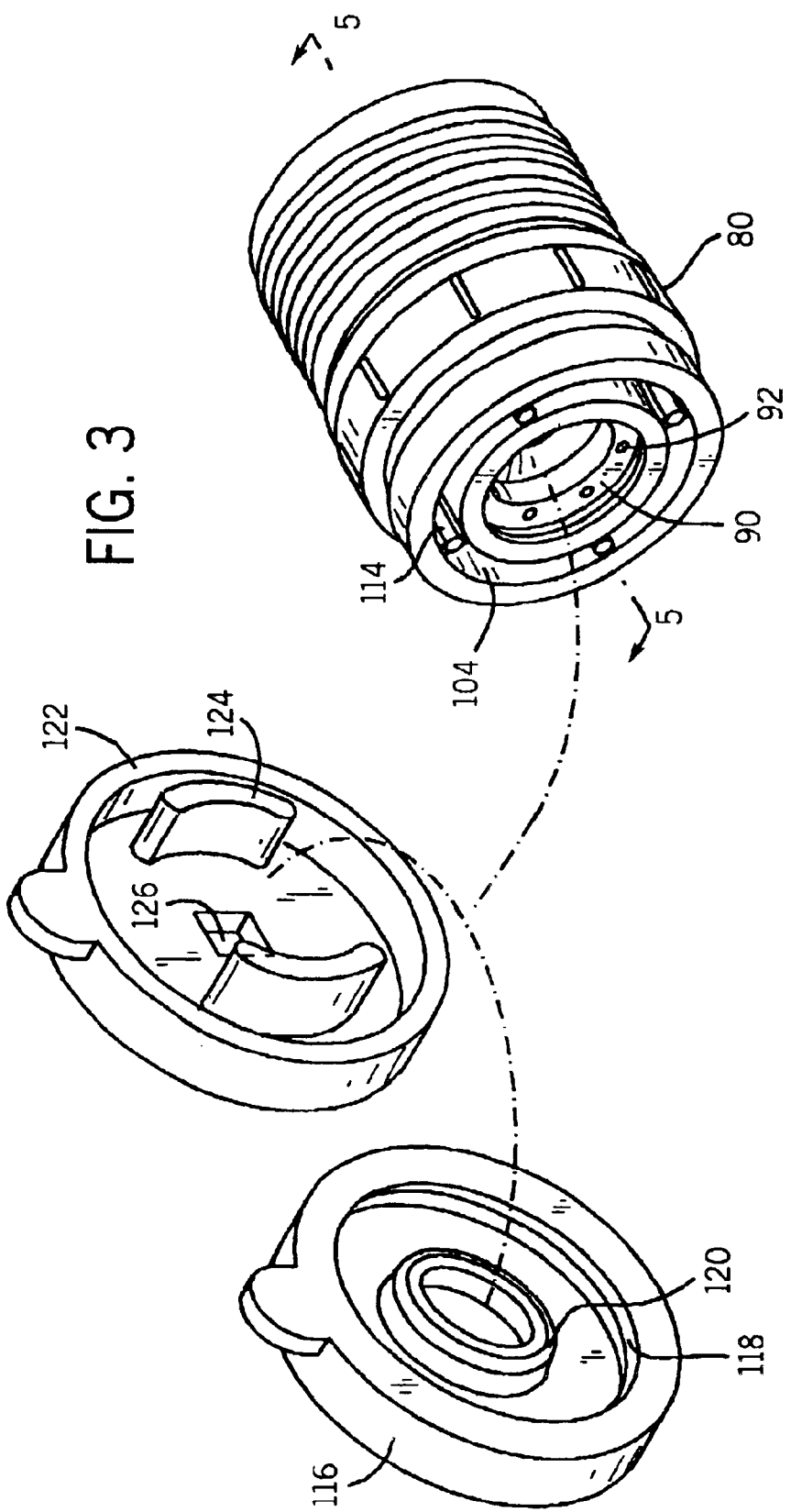

VALVE FOR WINTERIZING A POOL

FIELD OF THE INVENTION

This invention concerns an apparatus for eliminating water from pipes in a pool system, particularly without having to lower the pool water level.

BACKGROUND OF THE INVENTION

In climates that have freezing seasonal temperatures, the maintenance of swimming pools includes a winterizing process. As part of the winterizing process, the system of conduits and pipes that support water flow into and out of the pool are drained because water left in those pipes and conduits will freeze and expand as the temperature drops below freezing, damaging the pipes and fittings. For in-ground pools, the winterizing process typically involves the steps of draining water from all pipes situated above the frost line (typically to three feet below ground level), closing exposed orifices in the pool side wall to prevent ingress of water, debris, rain or snow into the pipes and conduits, and removing or protecting outside mechanical equipment. It is necessary to prepare swimming pools for such temperatures in order to avoid extensive damage, particularly to those pipes and conduits that are buried in the ground but above the frost line.

In most in-ground pool systems, the return and drain pipes are each fitted through its respective aperture in the pool wall. The pool apertures are typically situated well below the normal water line, perhaps by as much as thirty to fifty centimeters. In prior art winterization procedures, one must first reduce the water level to below the aperture levels so that the water remaining in the pipes above the frost line can be drained therefrom. Such a procedure requires extensive draining of pool water, which can take up to eight hours. Draining to that level can involve the removal of several thousand liters of water from a typical residential swimming pool, perhaps as much as twenty-five thousand liters. The drained water usually is wasted. After the pool is drained, the pipe ends are capped so that water and moisture cannot enter the pipes. The winterization process further includes refilling of the pool to about the normal water level to protect the pool structure from collapsing as the surrounding ground freezes and expands.

Referring to the drawings, a conventional swimming pool arrangement is illustrated by FIG. 1; the arrangement comprises generally the pool whose peripheral rectangular wall is shown at 11 and a circulation and filtration system, the several parts of which are encompassed within the area of the broken line 10, is situated contiguous to one end of the pool 11. Typically, the plumbing accessories include at least a main drain 12 which draws water and sediment from the bottom of the swimming pool and a skimmer 13 through which water to be filtered and re-circulated is withdrawn and debris is removed. In the circulation process, water withdrawn from the pool through the main drain and from the skimmer is filtered and optionally chemically treated and returned to the swimming pool through returns such as shown at 14 and 15.

A pump 24 withdraws water from the swimming pool, the water is filtered at 25, and through use of appropriate valves, such as 21 and 23, is reintroduced into the swimming pool at return points such as those illustrated at 14 and 15. Suction piping, some of which is illustrated at 19 and 20, and discharge piping, as shown at 16, 17 and 18, are utilized to move the water between the pump and the pool. The pool has a plurality of apertures to accommodate return piping 14 and 15 and main drain piping 20. Likewise, skimmer 13 has an aperture to accommodate suction piping 19. Portions of the piping referred to at 14, 15, 16, 17, 18, 19, and 20 are above the frost line and all water must be expunged therefrom to prevent freezing and damage to the piping system.

It is one object of the present invention to reduce the volume of water that must be drained from a pool during the winterization process.

SUMMARY OF THE INVENTION

A valve assembly has a housing that is threaded or otherwise configured so that it can be secured at a pool aperture to an inlet or outlet pipe-end. The assembly has a flow aperture and a flow conduit to support water or air flow there-through. A gate plate circumscribes at least a portion of the flow aperture and provides a flow occlusion surface. In a first, closed state, a valve gate having at least one gate-flow aperture is in contact with the flow occlusion surface. In this position, the flow occlusion surface obstructs water flow so water cannot flow through the gate-flow aperture(s). In a second, open state, the valve gate is positioned away from the flow occlusion surface under the pressure of air or water flowing through the flow conduit and the flow aperture, moving the valve gate to said second position. In this state, the valve gate is retained by a containment lip fixed to the valve housing, and a flow channel is formed from the housing flow aperture to the gate-flow aperture(s). Pumped water or air may thus flow from the pool pipe and through the flow conduit, flow aperture, flow channel, gate-flow aperture, and into the pool, until the pump is turned off and the valve gate returns, under the pressure differential of water in the pool to air in the pipe, to the closed position. Pool water moves the valve gate back to the first state, closing the valve.

BRIEF DESCRIPTION OF THE DRAWINGS

In describing the present invention, reference is made to accompanying drawings wherein:

FIG. 3 is an exploded perspective view that shows a second exemplary embodiment of the valve assembly of the present invention along with a valve cap and a valve socket.

DETAILED DESCRIPTION OF THE PREFERRED EMBODIMENT

Figure 1:
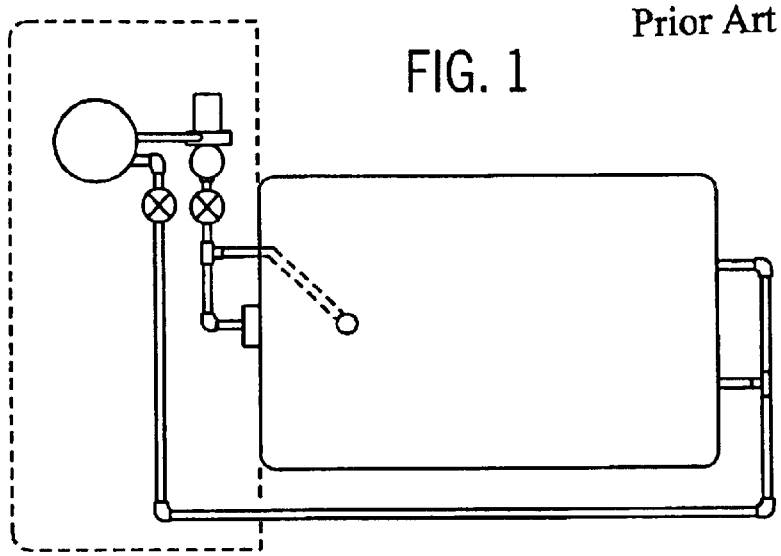
FIG. 1 is a schematic diagram illustrating by plan view a swimming pool equipped with a typical water circulating and filtration system.

According to the invention, a valve assembly is provided for use in the winterization process. A valve assembly is configured for fastening at a pool-wall aperture to a pipe end (inlet or outlet). In pool systems having a main drain, a valve assembly may be fastened thereto as well. As discussed in more detail below, the valve assembly opens to allow water to be pumped through a pipe/conduit and into the pool, and closes to prevent pool water from flowing back into the pipe/conduit. The valve assembly of the present invention thereby obviates the need to drain the pool to a water level below the pool-wall apertures (in FIG. 1, associated with the returns 14 and 15, skimmer 13, and main drain 12) for emptying the pipes and conduits of all water.

Figure 2:
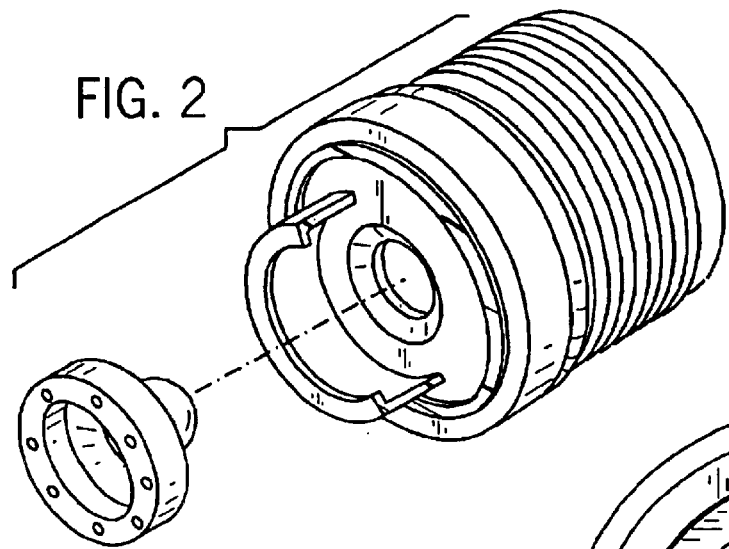
FIG. 2 is an exploded perspective view showing a first exemplary embodiment of the valve assembly of the present invention.
Figure 6:
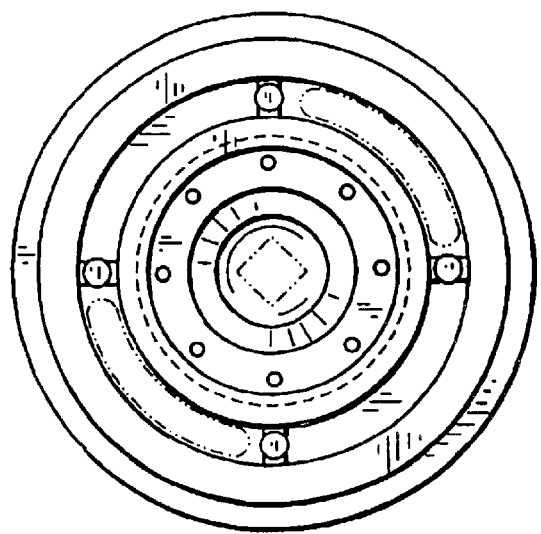
FIG. 6 is a end view of the valve assembly of the second embodiment of the present invention showing in phantom components of a socket as applied to the valve.
Figure 4:
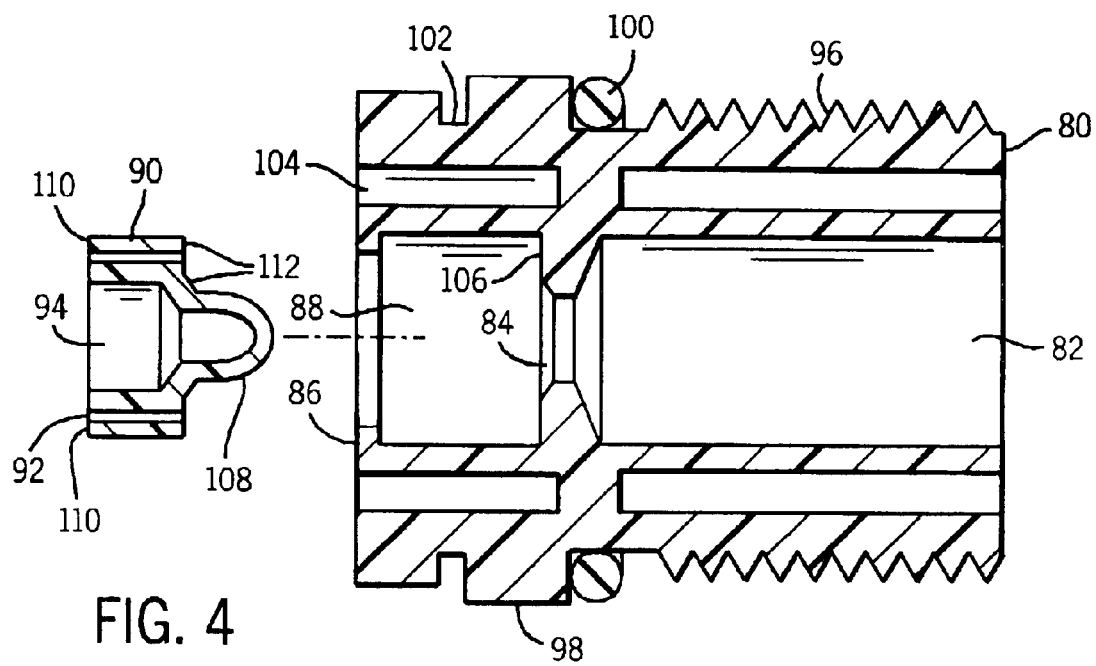
FIG. 4 is an exploded cross-sectional view taken along lines 5—5 of FIG. 3.

Referring to FIG. 2, a first embodiment of the valve assembly of the present invention includes a main valve housing 50 and a valve gate 52. The valve housing 50 includes a flow aperture 54 open to a flow conduit or cavity, not visible in FIG. 2. The flow conduit continues through the opposite end 56 of the housing. The valve housing has threads 70 for securing the valve assembly at a pool aperture to an end of the pipe/conduit to be drained. A rim 72 is preferably molded to or part of the valve housing so the valve assembly can be tightened against the pool wall. A gasket is preferably utilized to form an airtight seal between the rim 72 and the pool wall/surface.

The valve gate 52 preferably includes a conical plug 58 configured to rest against a housing seat 76 when the valve is closed, as discussed below. Preferably, the conical plug 58 is hollow, the outer shell configured to fit within flow aperture 54 allowing the plug to glide along the housing seat 76. The valve gate 52 includes a control plate 62 having an opening 68 leading to the hollow portion of the conical plug 58. Preferably, the dimension (diameter) of opening 68 is uniform with that of the adjoining hollow portion of conical plug 58. The control plate 62 further includes a plurality of small holes or gate-flow apertures 66(*a*), 66(*b*), 66(*c*), and 66(*d*) extending therethrough and circumferentially disposed around the plate.

In one embodiment, the valve is assembled by pressing the control plate 62 onto and past a plastic semi-flexible containment lip 64 and into a gate channel defined by the containment lip 64, a valve housing gate channel wall 78, and a housing gate plate 60. The gate channel confines movement of the valve gate between a "valve open" position and a "valve closed" position. As noted, the main valve housing 50 has a circular containment lip 64 extending radially inward from a main valve housing gate channel wall 78 (partially shown).

The containment lip catches the control plate 62 by a portion of its outer perimeter when the valve gate 52 moves, under the force of water or air flowing out of the pool pipe, away from the housing gate plate 60 to a "valve open" position. The containment lip 64 is far enough away from the housing gate plate 60 to allow the valve gate to move a limited distance (preferably one-half centimeter) from the housing gate plate 60, thereby allowing water to flow through a flow channel formed between the housing gate plate 60 and the control plate 62. Water or air may thus flow through the flow aperture 54, through the gate-flow apertures 66(*a*), 66(*b*), 66(*c*), and 66(*d*), and into the pool.

In application, the valve assembly is tightened into an aperture of the pool leading to a drain or return. The pump and pump system valves are adjusted so that air is pumped through the corresponding pipe. Pressurized air in the pipe will push the water toward the orifice and will force the valve gate 52 away from the housing gate plate, allowing water to flow through the valve.

After all the water has exited the pipe, the pump is turned off. At this point, the water in the pool will exert force against the control plate 62 and the interior of the conical plug 58 sufficient to move the valve gate 52 to the closed position. In the closed position the control plate 62 is in contact with and pressed against the surface (occlusion surface) of the housing gate plate 60, closing off the gate-flow apertures 66(*a*), 66(*b*), 66(*c*), and 66(*d*), thus preventing pool water from flowing into the valve and back into the pipe. In an alternate embodiment, the water in the pool forces the valve gate 52 against the housing gate plate 60 and prevents water from flowing through the flow aperture 54, thus closing the valve. In another embodiment, both the gate-flow apertures and the flow aperture are closed off when the valve gate contacts the housing gate plate 60.

Depending upon the pumping capacity of pump 24, each of the return conduits 14 and 15, the skimmer conduit 19, and main drain conduit 22 may be emptied individually/sequentially, in pairs, or all at the same time. In any case, it is preferred that one valve assembly be provided for each conduit.

Preferably, both the main valve housing 50 and the valve gate 52 are molded from forty percent calcium-filled polypropylene.

A second embodiment of the valve assembly of the present invention is shown in FIGS. 3–6. The valve assembly of this embodiment has a valve housing 80 and a valve gate 90. As shown in the cross-sectional view of FIG. 4, the valve housing 80 has a flow cavity 82 for directing water or air flow from a pipe or conduit to a flow aperture 84. A containment lip 86 extends radially inward at one end of the valve housing. A gate channel 88 is defined on one side by the containment lip 86 and on the opposite side by a gate plate 106. A valve gate 90, having a plurality of gate-flow apertures 92 (see FIG. 3), is configured for reciprocating movement within gate channel 88. Water or air pumped into the flow cavity 82 exerts force against, preferably, a conical structure 108 of the valve gate 90. This force moves the valve gate to an open position wherein the outer perimeter 110 of the valve gate is pressed against the containment lip 86 (shown in phantom as 110(*b*) in FIG. 5) and the conical portion of the valve gate, shown as 108(*b*), is removed from the flow aperture. In this position a flow channel exists between the gate plate 106 and the opposing surface 112 of the valve gate. In the preferred embodiment the flow channel is four centimeters wide. The plurality of gate-flow apertures 92 allow water or air to flow out of the valve assembly and into the pool. In the preferred embodiment, there are eight gate-flow apertures, each most preferably being circular in shape, having a diameter of seventy-eight one-thousands of an inch, and being disposed circumferentially about the valve plate.

Figure 5:
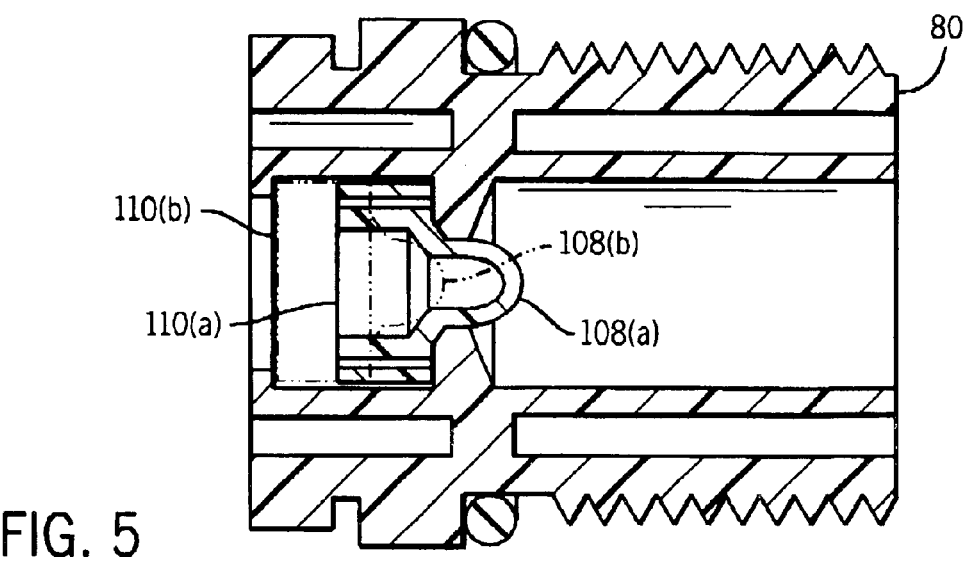
FIG. 5 is a cross-sectional view taken along lines 5—5 of FIG. 3 showing the valve gate in the valve closed position and showing in phantom the valve gate in the open position.

When the pool pump is turned-off and air is in the pool pipe, the water in the pool exerts force against the inner surface 94 and the outer surface 110 of the valve gate 90, moving the valve gate to a closed position (shown in FIG. 5). In this embodiment, flow aperture 84 is shaped to receive conical structure 108(*a*) and guide the valve gate as it moves between the open and the closed position. In the closed position the opposing surface 112 of the valve gate is juxtaposed to the gate plate 106, closing off the gate-flow apertures 92, preventing pool water from flowing back into the flow cavity 82.

The valve housing is configured so that it may be secured at a pool aperture to a pipe end. Typically, the pipe end is internally threaded. Thus, the valve housing is preferably provided with a threaded outside surface 96 having a diameter of one and seven-hundred and fifty one-thousands inches, and a rim 98 for securing the valve assembly to a pool orifice. A one-eight inch diameter O-ring 100 is preferably utilized to ensure an air-tight seal between the valve assembly and the pipe end, as well as between the outer diameter of the valve assembly and inner diameter of the pool wall or pipe mounting plate. It is preferable to coat threaded surface 96 with several layers of a suitable tape, such as that sold under the trademark TEFLON®, to create a seal between the valve housing and the pipe end, and also to prevent the housing threads from burning (due to friction heat) to the pipe threads as the housing is screwed on.

To facilitate molding of the valve housing, in one embodiment components of the valve housing are tapered in accordance with the following: the diameter of the threaded surface of the housing is tapered down six one-hundredths of an inch from the O-ring to the end of the housing; the diameter of the flow cavity is increased one hundred and twenty five one-thousandths of an inch from the flow aperture 84 to the end of the housing; the diameter of the gate channel 88 is increased one one-hundredth of an inch from the flow aperture to the containment lip; the outer diameter of the housing is tapered three one-hundredths of an inch from groove 102 to the end of the valve (the end associated with the containment lip); housing surfaces defining other open spaces (such as shown at 104) in the valve housing may also be slightly tapered to facilitate the molding process.

Referring again to FIG. 3, optional but preferred winterization components are shown and include a rubber cap 116. The rubber cap can be provided for placement over the valve assembly after all the water is pumped out of a pipe and the valve closes. The rubber cap 116 functions to further ensure that water/moisture cannot enter the valve assembly. In this embodiment, the valve housing preferably has a groove 102 (see FIG. 4) configured for receiving a radially inward extending lip 118 of the rubber cap for securing the cap to the valve housing. Preferably, the rubber cap also has a raised surface 120 dimensioned to cover the outer surface 110 (see FIG. 4) and/or flow apertures 92 of the valve gate 90 when the valve housing receives the cap. The raised surface further serves to hold the valve gate against the gate plate. With the valve assembly in a closed state and the pipe having been emptied of all water the cap is preferably placed on the valve for the duration of the winter. To facilitate placement of the cap 116 over the valve assembly, marine grease may be rubbed along the lip 118 and over the raised surface 120.

At the end of the winter season, the rubber cap is removed and the valve assembly is unscrewed from the pipe end. Referring once again to FIG. 3, a valve assembly socket 122 is shown as an optional component. The valve assembly socket 122 is used to loosen the valve assembly from the pipe. The socket has a pair of arcuate dogs 124 configured to fit into an open space 104 of the valve housing 80 (shown in FIG. 6) having a catch 114 on both sides thereof A preferably square-shaped aperture 126 (also shown in phantom in FIG. 6) receives a wrench, enabling one to generate sufficient torque to remove the valve assembly.

Preferably, the valve assembly of the second embodiment and socket are molded from forty percent calcium-filled polypropylene.

It is to be understood that the above-described embodiments are merely illustrative of the principles of the invention and that many variations may be devised by those skilled in the art without departing from the scope of the invention. It is, therefore, intended that such and other variations be included within the scope of the claims.

I claim:

1. An apparatus for use in discharging fluid from a pool pipe fitted to a swimming pool aperture, comprising:

a valve housing having an inlet and an outlet and securable to said pool pipe for receiving at said inlet fluid discharged from said pool pipe; and a valve gate within said valve housing comprising a plug and a control plate fixed perpendicularly to the central axis of the plug, the periphery of the control plate extending radially beyond the plug and having at least one flow aperture, wherein said valve gate is moveable within said valve housing to a first position having said at least one flow aperture spaced from said valve housing for permitting fluid to flow through said valve housing and to a second position having said at least one flow aperture adjacent said valve housing for occluding the flow of fluid through said valve housing.

2. The apparatus of claim 1 wherein said plug is conical.

3. The apparatus of claim 1 wherein said valve housing includes a cylindrical flow conduit having a length defined by said flow aperture and said outlet.

4. The apparatus of claim 1 wherein said housing surface includes a valve cap receiving groove.

5. The apparatus of claim 1 wherein said housing includes means for receiving a socket.

6. An apparatus for use in discharging fluid from a pool pipe fitted to a swimming pool aperture, comprising:

a valve housing having an inlet and a flow aperture therein, secureable to said pool pipe for receiving fluid discharged from said pool pipe at said swimming pool aperture;

a gate plate within said valve housing circumscribing said flow aperture; and a control plate within said valve housing and having at least one flow aperture therethrough, moveable to a first position removed from said gate plate for permitting fluid to flow through said flow aperture, and to a second position having said flow aperture in contact with said gate plate for occluding the flow of fluid into said pipe.

7. The apparatus of claim 6 further comprising a containment lip for restraining the movement of said control plate beyond said first position.

8. The apparatus of claim 6 wherein said valve housing and said control plate are comprised of molded plastic.

9. The apparatus of claim 6 further comprising a flow cavity within said housing for containing the flow of fluid received at said inlet to said flow aperture.

10. The apparatus of claim 6 wherein said housing has a threaded outer surface for securing said valve housing to said pool pipe.

11. A The apparatus of claim 6 wherein said flow aperture is circular.

12. The apparatus claim 6 wherein said housing includes a valve cap receiving groove and means for receiving a socket.

13. The apparatus of claim 7 wherein said housing comprises a valve channel therethough, said valve channel comprising a gate channel having a length defined by said gate plate and said containment lip.

14. A valve operable between an open state and a closed state for use in discharging fluid from a pool pipe having an opening adjacent a pool surface aperture in a pool having water at said aperture, comprising:

a valve housing comprising a conduit and securable to said pool pipe for receiving fluid from said pool pipe;

a gate channel having an inlet and an outlet within said conduit; and a valve gate within said gate channel having at least one flow aperture oriented in parallel relationship to said gate channel for permitting fluid to flow through said conduit in the valve open state and occluding fluid flow through said conduit in the valve closed state wherein in the closed state, the at least one flow aperture is in contact with the valve housing.

15. The apparatus of claim 14 wherein said housing conduit encloses a valve channel.

16. The apparatus of claim 14 said housing includes means for receiving a socket.

17. The apparatus of claim 14 wherein said valve gate comprises a conical plug.

18. A swimming pool valve assembly for use in draining a swimming pool pipe and operable between a closed state for preventing pool water from flowing into the swimming pool pipe and an open state for allowing water to flow through the valve assembly and into the pool, said valve assembly comprising:

a housing having a valve channel there though, said valve channel having an inlet defined by a gate plate;

a gate configured for reciprocal movement within said valve channel having at least one gate-flow aperture having an inlet and an outlet, wherein said gate is configured reciprocating movement within said valve channel between a valve-open position allowing fluid to flow through said at least one gate-flow aperture and a valve-closed position wherein said aperture inlet is in contact with the gate plate.

19. The valve assembly of claim 18 wherein said valve housing and said gate are comprised of molded plastic.

20. The valve assembly of claim 18 said housing includes a valve cap receiving groove.

21. The valve assembly of claim 18 wherein said housing includes means for receiving a socket.

* * * * *